(12) United States Patent
Alamri et al.

(10) Patent No.: US 11,236,195 B2
(45) Date of Patent: Feb. 1, 2022

(54) CORROSION-INDICATING MATERIALS AND METHODS OF MAKING AND USING THE SAME

(71) Applicant: Saudi Arabian Oil Company, Dhahran (SA)

(72) Inventors: Haleema Alamri, Thuwal (SA); Aziz Fihri, Paris (FR); Mohamed Bouhrara, El Jadida (MA); Enrico Bovero, Dhahran (SA); Bashayer Mishari, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/799,137

(22) Filed: Feb. 24, 2020

(65) Prior Publication Data

US 2021/0269584 A1    Sep. 2, 2021

(51) Int. Cl.
  C08G 59/50    (2006.01)
  C08G 59/24    (2006.01)
  C09D 163/00   (2006.01)
  G01N 17/04    (2006.01)
  G01N 21/78    (2006.01)
  G01N 17/00    (2006.01)
  C09D 5/00     (2006.01)

(52) U.S. Cl.
  CPC ......... *C08G 59/506* (2013.01); *C08G 59/245* (2013.01); *C09D 163/00* (2013.01)

(58) Field of Classification Search
  None
  See application file for complete search history.

(56) References Cited

U.S. PATENT DOCUMENTS 5,646,400 A    7/1997 Perez

FOREIGN PATENT DOCUMENTS

| CN | 106189771 A | * 12/2016 |
| EP | 3483231 A1 | 5/2019 |
| JP | 2012149109 A | * 8/2012 |
| JP | 2012149109 A | 8/2012 |

OTHER PUBLICATIONS

Aguilar et al., "Dinuclear ZnII Complexes of Polydentate Polyamines as Minimalist Models of Hydrolytic Reactions", Eur. J. Inorg. Chem., pp. 4061-4071, 2004.
Arca et al., "Conformationally locked pentadentate macrocycles containing the 1,10-phenanthroline unit. Synthesis and crystal structure of 5-oxa-2,8-dithia[9](2,9)-1,10-phenanthrolinophane (L) and its coordination properties to NiII, PdII, PtII, RhIII and RuII", J. Chem. Soc., Dalton Trans., pp. 1180-1188, 2001.
Augustyniak et al., "Early Detection of Steel Corrosion via "Turn-On" Florescence in Smart Epoxy Coatings", Applied Materials & Interfaces, vol. 1, No. 11, pp. 2618-2613, 2009.
Augustyniak et al., "Early detection of aluminum corrosion via "turn-on" fluorescence in smart coatings"Progress in Organic Coatings, vol. 71, pp. 406-412, 2011.
Bazzicalupi et al., "Phenanthroline-containing macrocycles as multifunctional receptors for nucleotide anions. A thermodynamic and NMR study", J. Chem. Soc., Perkin Trans. vol 2, pp. 1675-1682, 1999.
Bazzicalupi et al., "Polyamine Receptors Containing Dipyridine or Phenanthroline Units: Clues for the Design of Fluorscent Chemosensors for Metal Ions", Chem. Eur. J., vol. 15, pp. 8049-8063, 2009.
Blake et al., "A new class of mixed aza-thioether crown containing a 1,10-phenathroline sub-unit", J. Chem. Soc., Dalton Trans., pp. 3705-3712, 1996.
Bryant et al., "The use of fluorscent probes for the detection of under-film corrosion", Progress in Organic Coatings, vol. 57, pp. 416-420, 2006.
Buchheit et al., "Active corrosion protection and corrosion sensing in chromate-free organic coatings", Progress in Organic Coatings, vol. 47, pp. 174-182, 2003.
Dohle et al., "Smart acrylic coatings for corrosion detection", Progress in Organic Coatings, vol. 110, pp. 140-149, 2017.

(Continued)

*Primary Examiner* — Ha S Nguyen
(74) *Attorney, Agent, or Firm* — Dinsmore & Shohl

(57) ABSTRACT

A corrosion-indicating material and methods of producing and using the corrosion-indicating material are provided. The corrosion-indicating material comprises a cured product of reacting a bisphenol A diglycidyl ether epoxy (DGEBA) resin with a curing agent, the curing agent comprising a 1,10-phenanthroline derivative having formula (I):

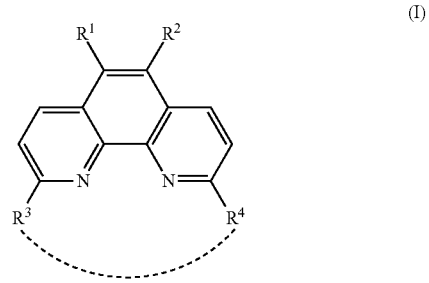

(I)

where: $R^1$ and $R^2$ are independently selected from $-NH_2$; $-NH(CH_2)_a NH_2$, where a is 1, 2, or 3; $-OC(=O)(CH_2)_b NH_2$, where b is 1, 2, or 3; and $-H$; $R^3$ and $R^4$ are either: non-joined monovalent radicals each independently chosen from $-H$, $-NH_2$, and $(C_1$-$C_{20})$heterohydrocarbyls comprising at least one primary amine or at least one secondary amine; or joined as a single divalent radical, the single divalent radical being a $(C_1$-$C_{40})$heterohydrocarbyl comprising at least one primary amine or at least one secondary amine; and at least one of $R^1$, $R^2$, $R^3$, and $R^4$ is not $-H$.

10 Claims, No Drawings

(56) References Cited

OTHER PUBLICATIONS

Mendoza et al., "Hydrogen-ion driven molecular motions in Cu2+-complexes of a ditopic phenanthrolinophane ligand", Chem Commun., pp. 3032-3033, 2003.

O'Mahony et al., "Voltammetry of chromium(VI) at the liquid/liquid interface", Electrochemistry Communications, vol. 7, pp. 976-982, 2005.

Roshan et al., "Monitoring underlying epoxy-coated St-37 corrosion via 8-hydroxyquinoline as a fluorescent indicator", Applied Surface Science, vol. 440, pp. 880-888, 2018.

Wheat, "Smart Coatings for Corrosion Detection-A Review of Recent Advances", Proceedings of the Twenty-second (2012) International Offshore and Polar Engineering Conference, pp. 360-363, Jun. 17-22, 2012.

Zhang et al., "Corrosion-Sensing Behavior of an Acrylic-Based Coating System", Corrosion, vol. 55, No. 10, pp. 957-967, Jul. 1999.

Zhao et al., "Palladium(II) complexes with N,N'-Dialkyl-1,10-phenanthroline-2,9-diamathanamine: synthesis, characterization and cytotoxic activity", Journal of Inorganic Biochemistry, pp. 173-177, 1998.

Agarwala et al., "Corrosion Detection and Monitoring—A Review", Corrosion 2000, Paper No. 00271, NACE International, 2000.

Al-Sharani et al., "The effect of Clay Structures on the Modification Process to Synthesize Polymer-Clay Nanocomposites", Journal of Materials and Environmental Sciences, vol. 8, Issue 6, pp. 2192-2202, 2017.

Keypour et al., "New macrocyclic Schiff base complxes incorporating a phenanthroline unit: Part 1; Template synthesis of three Cadmium(II) complexes and crystal structure, NMR and ab initio studies", Inorganica Chimica Acta 360 pp. 2298-2306, 2007.

Keypour et al., "New macrocyclic Schiff base complxes incorporating a phenanthroline unit: Part 2: Template synthesis of some maganese(II) complexes and crystal structure studies", Inorganica Chimica Acta 361, pp. 1415-1420, 2008.

Rinaldi, Ginoo, "A Literature Review of Corrosion Sensing Methods", Defence Research and Development Canada, Technical Memorandum, DRDC Atlantic TM 2009-082, Sep. 2009.

Saidarasamoot et al., "Assessment of the Emerging Technologies for the Detection and Measurement of Corrosion Wastage of Coated Marine Structures", The 22nd International Conference on Offshore Mechanics & Artic Engineering, Proceedings of OMAE, Jun. 8-13, 2003.

Shepard et al., "Introduction to active thermography for non-destructive evaluation", Anti-Corrosion Methods and Materials, vol. 44, Issue 4, Nov. 4, 1997.

International Search Report and Written Opinion dated Jul. 6, 2021 pertaining to International application No. PCT/US2021/019002 filed Feb. 22, 2021, 14 pages.

Dhole, G. S. et al. "Modified Epoxy Coatings for Corrosion Detection", Corrosion, Coden: Corrak, vol. 73, No. 4, Apr. 2017, pp. 326-338.

Kim, J. et al. "Preparation and properties of luminescent metal-complex containing conjugated and non-conjugated polymers", Polymer Preprints, American Chemical Society, US, vol. 40, No. 2, Jan. 1, 1999, pp. 1237-1238.

Dhole, G.S. et al. "Smart corrosion sensing phenanthroline modified alkyd coatings", Progress in Organic Coatings, vol. 89, 2015, pp. 8-16.

* cited by examiner

CORROSION-INDICATING MATERIALS AND METHODS OF MAKING AND USING THE SAME

BACKGROUND

Field

The present specification generally relates to corrosion-indicating materials and, more particularly, to color-changing corrosion-indicating materials and methods for forming and using the same.

Technical Background

Organic coatings may be utilized in a vast array of products and industries, including, for example, corrosion protection of metallic structures such as steel pipes or steel storage tanks. The organic coating may form a barrier between the metal and corrosive conditions, repress electrochemical reactions that occur at the metal-coating interface, or both. In all such applications, the early detection of corrosion under the coating is critical to maintaining the structural integrity of the metal and to reduce maintenance costs. However, conventional visual inspection of the metallic structure and organic coating is ineffective and inefficient, as a conventional visual inspection cannot detect early-stage corrosion at the metal-coating interface. To detect early-stage corrosion at the metal-coating interface, techniques such as thermal imaging, radiographic imaging, electromagnetic imaging, ultrasonic imaging, microwave imaging, and electromagnetic imaging may be employed. However, each of these techniques require the use of specialized equipment or instruments. Additionally, none of these techniques can assess large or complicated metal structures such as offshore and onshore metallic platforms for oil and gas production or other metal structures that would obstruct conventional inspection techniques.

Accordingly, ongoing needs exist for organic coatings that facilitate early detection of corrosion under the coating at the metal-coating interface. The coatings described in this disclosure address this need by employing color-changing technology such that the color of the coating changes upon contact with corrosion products, thereby indicating the presence of corrosion under the coating at the metal-coating interface immediately.

SUMMARY

Some embodiments of the present disclosure are directed to corrosion-indicating materials. The corrosion-indicating materials indicate corrosion of a metal substrate underlying the corrosion-indicating material. The corrosion-indicating materials include a cured product of reacting a bisphenol A diglycidyl ether (DGEBA) epoxy resin with a curing agent. The curing agent includes a 1,10-phenanthroline derivative having formula (I):

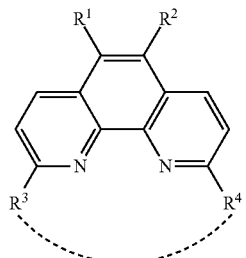

In formula (I), $R^1$ and $R^2$ are independently selected from —$NH_2$; —$NH(CH_2)_a NH_2$, where a is 1, 2, or 3; —$OC(=O)(CH_2)_b NH_2$, where b is 1, 2, or 3; and —H. $R^3$ and $R^4$ are either: non-joined monovalent radicals each independently chosen from —H, —$NH_2$, and ($C_1$-$C_{20}$)heterohydrocarbyls including at least one primary amine or at least one secondary amine; or joined as a single divalent radical, the single divalent radical being a ($C_1$-$C_{40}$)heterohydrocarbylene including at least one primary amine or at least one secondary amine. Additionally, at least one of $R^1$, $R^2$, $R^3$, and $R^4$ is not —H.

Specific embodiments will now be described with references to the figures. Whenever possible, the same reference numerals will be used throughout the drawings to refer to the same or like parts. As used throughout this disclosure, the singular forms "a," "an" and "the" include plural referents unless the context clearly dictates otherwise. Thus, for example, reference to "a" component includes aspects having two or more such components, unless the context clearly indicates otherwise.

DETAILED DESCRIPTION

Corrosion-indicating materials according to embodiments include a cured product of reacting a bisphenol A diglycidyl ether (DGEBA) epoxy resin with a curing agent to form a cured resin. The cured resin includes a resin backbone of DGEBA crosslinked through or terminated by molecules of the curing agent. In embodiments, the curing agent is chosen from a class of 1,10-phenanthroline derivatives that will be subsequently described. The 1,10-phenanthroline derivatives situated within the cured product include particular atoms or functional groups such as nitrogen atoms or primary or secondary amines, for example. The functional groups are capable of donating electrons to metal ions to form complexes with the metal ions. The complexes formed in this manner may have characteristic colors that are imparted to the corrosion-indicating material. In embodiments, the corrosion-indicating material has an initial color before exposure of the corrosion-indicating material to metal ions. When the corrosion-indicating material is subsequently exposed to the metal ions, typically in the presence of moisture, the complexes form and the corrosion-indicating material changes to a corrosion-indicative color different from the initial color. The actual corrosion-indicative color and its intensity may depend on factors such as the identity of the curing agent, the concentration of the curing agent within the cured product, and the identity of the metal ion.

The corrosion-indicating materials according to embodiments may be applied to a substrate as a coating material for the substrate or a particular surface thereof. When applied to a substrate as a coating material, the coating including the corrosion-indicating material overlies the substrate or, stated in an equivalent manner, the substrate underlies the coating including the corrosion-indicating material. In particular embodiments, the substrate may be a metal substrate. The metal substrate may be a unitary metal body or may be a metal part or metal component of an apparatus.

It should be understood that the terms "overlies" and "underlies" or "overlying" and "underlying" are not intended to limit the orientation of the metal substrate and the coating material with respect to any particular vertical or horizontal direction, except insofar as "over" and "under" are intended to refer to opposite directions. Moreover, a coating layer according to embodiments of this disclosure that overlies a substrate such as a metal substrate may physically contact the metal substrate directly, but need not necessarily physically contact the metal substrate directly. For example, the coating layer may be applied over one or more intermediate layer, where the one or more intermediate layers also overlie the substrate, but only one such intermediate layer is in direct physical contact with the metal substrate. It should be understood that the coating layers formed from a corrosion-indicating material according to embodiments of this disclosure may be regarded to overlie the metal substrate if the proximity of the coating layer to the metal substrate is such that corrosion of the metal substrate triggers an indication of corrosion in the corrosion-indicating material. The indication of corrosion may include a color change, such as will be described subsequently in greater detail.

The process of metal corrosion typically involves oxidation of a metal to one or more positively-charged metal ions. Corrosion is common in environments where the metal is exposed to moisture. Thus, when a metal substrate underlying a coating of corrosion-indicating material according to embodiments corrodes, the positively-charged metal ions and molecules of water from the moisture can contact portions of the corrosion-indicating material. As the contact occurs, complexes form between the curing agent component of the corrosion-indicating material, the positively-charged metal ions, and the water molecules. Thereby, the corrosion-indicating material changes color. The change of color may serve as a detectable indicator of corrosion. Detection of corrosion may be carried out as simply as by visually noting a dramatic color change of coated areas of the metal substrate.

In some embodiments, the detection of corrosion may involve spectrophotometric determination and analysis of color changes, in view of an expected characteristic absorption or fluorescence wavelength that can be monitored actively or remotely. For example, ultraviolet-visible (UV-VIS) absorption spectra of a corrosion-indicating material may be monitored within a wavelength range including one or multiple absorption maxima for metal complexes expected to form when the corrosion-indicating material is exposed to metal ions upon corrosion of the underlying substrate. Changes to the absorption spectra that indicate corrosion include bathochromic shifts of one or more characteristic absorption peaks and hyperchromic shifts of one or more characteristic peaks. In example embodiments, characteristic UV-VIS absorption maxima of 1,10-phenanthroline derivatives may be evaluated to assess bathochromic shifts, hyperchromic shifts, or both. Such characteristic absorption maxima for 1,10-phenanthroline may arise in wavelength regions such as from 200 nm to 500 nm, or from 200 nm to 400 nm, or from 250 nm to 400 nm, for example. Specific examples include 1,10-phenanthroline derivative absorption maxima at 282 nm and 365 nm.

Bathochromic shifts, known also as red shifts, are shifts of a characteristic peak to a lower energy or longer wavelength. Thus, observation of a bathochromic shift provides qualitative information in that before corrosion occurs the corrosion-indicating material exhibits a UV-VIS peak at one characteristic wavelength, whereas after corrosion occurs the corrosion-indicating material exhibits a corresponding UV-VIS peak at a slightly longer wavelength. Hyperchromic shifts of a UV-VIS peak result from an increased concentration of a complex within the corrosion-indicating materials. Such characteristic absorption maxima for 1,10-phenanthroline may arise in wavelength regions such as from 200 nm to 500 nm, or from 200 nm to 400 nm, or from 250 nm to 400 nm, for example. Examples of bathochromic shifts indicative of complex formation may include shifting of any characteristic UV-VIS absorption band by 1 nm to 100 nm, or by 1 nm to 50 nm, or by 1 nm to 20 nm, or by 1 nm to 10 nm, or by 5 nm to 50 nm, or by 10 nm to 50 nm, or by 20 nm to 50 nm from an initial wavelength to a corrosion-indicative wavelength longer than the initial wavelength.

Hyperchromic shifts are observable by comparing initial characteristic peak heights upon application of the corrosion-indicating material with later characteristic peak heights measured when corrosion is assessed. In such assessments, an increase in peak heights over those of the initial measurement indicate corrosion by an increase in the amount of absorption at the characteristic wavelength of the complex formed when ions contact the corrosion-indicating material. Thus, observation of hyperchromic shift provides quantitative information as to the amount of complex formation and, accordingly, to the extent of the corrosion of the underlying substrate. Hyperchromic shifts indicative of complex formation may include increase in percent absorption at any characteristic UV-VIS absorption band by at least 1%, at least 2%, at least 5%, at least 10%, at least 20%, or at least 50%. The increase in percent absorption may be determined by comparing percent absorption of a particular peak of the UV-VIS spectrum from an initial measurement with the percent absorption of a corresponding peak of the UV-VIS spectrum at a later measurement upon assessment of corrosion over time. It should be understood that the precise wavelengths of the initial measurement and the later measurement may not necessarily be identical, particularly if a bathochromic shift of the characteristic peak has occurred. Thus, the corresponding peak in the later measurement should be understood to be the peak corresponding to the peak observed in the initial measurement but shifted to a longer wavelength in the later measurement.

Complex formation in the corrosion-indicating material and, in turn, corrosion of a substrate underlying the corrosion-indicating material, also may be assessed by monitoring fluorescence spectra of the corrosion-indicating material. When interrogated with light of a specific wavelength, the corrosion-indicating material will emit various wavelengths by fluorescence. The specific fluorescence wavelengths and their respective intensities vary with respect to the presence of complexes in the corrosion-indicating material and the concentration of the complexes in the corrosion-indicating material.

Specific non-limiting embodiments of corrosion-indicating materials will now be described. Embodiments of coated articles incorporating the corrosion-indicating materials and of methods incorporating the corrosion-indicating materials will be described subsequently.

According to embodiments, corrosion-indicating materials are provided that indicate corrosion of a metal substrate underlying the corrosion-indicating material. The corrosion-indicating materials are or include a cured product of reacting an uncured bisphenol A diglycidyl ether (DGEBA) epoxy resin with a curing agent.

DGEBA is an organic compound used as a constituent of epoxy resins. DGEBA may be prepared by O-alkylation of bisphenol A with epichlorohydrin. Uncured DGEBA resin has the following structure:

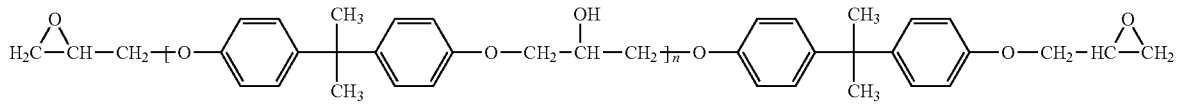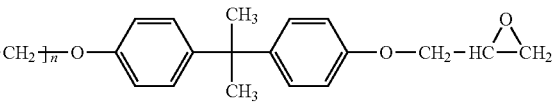

In embodiments of the corrosion-indicating material, the curing agent that is reacted with the DGEBA is chosen from one or a combination of 1,10-phenanthroline derivatives having formula (I):

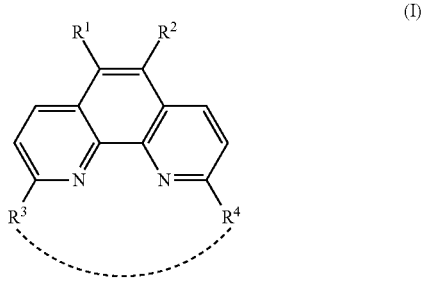

(I)

In formula (I), $R^1$ and $R^2$ are independently selected from —$NH_2$; —$NH(CH_2)_aNH_2$; where a is 1, 2, or 3; —OC(=O)$(CH_2)_bNH_2$, where b is 1, 2, or 3; and —H. Thus, $R^1$ and $R^2$ may be unsubstituted (when either or both are —H) or substituted with a functional group including at least one primary amine or at least one secondary amine, of which —$NH(CH_2)_aNH_2$ and —OC(=O)$(CH_2)_bNH_2$ are exemplary.

In formula (I), the dashed line between $R^3$ and $R^4$ indicates an optional covalent connection of $R^3$ and $R^4$. In some embodiments, $R^3$ and $R^4$ may be non-joined monovalent radicals each independently chosen from —H, —$NH_2$, and $(C_1-C_{20})$heterohydrocarbyls that include at least one primary amine or at least one secondary amine. In some embodiments, $R^3$ and $R^4$ may be joined to the base 1,10-phenanthroline molecule as a single divalent radical. In such embodiments, the single divalent radical may be a $(C_1-C_{40})$ heterohydrocarbylene including at least one primary amine or at least one secondary amine.

According to some embodiments of the corrosion-indicating material, the curing agent according to formula (I) is not 1,10-phenanthroline. For such embodiments, in formula (I) at least one of $R^1$, $R^2$, $R^3$, and $R^4$ is not —H.

As used herein, the phrase "independently selected from" referring to two or more variable groups means that the variable groups may be the same as each other or different from each other, without respect to the identities of the groups, subject to any explicit limitations or provisos.

The term "hydrocarbon" means a chemical group composed exclusively of carbon atoms and hydrogen atoms. A "hydrocarbon radical" is a hydrocarbon from which one hydrogen atom has been removed. A "hydrocarbon diradical" is a hydrocarbon from which two hydrogen atoms have been removed, typically one hydrogen atom from each of two different carbon atoms.

The term "$(C_X-C_Y)$hydrocarbyl" means a hydrocarbon radical of from X to Y carbon atoms, in which each hydrocarbon radical is aromatic or non-aromatic, saturated or unsaturated, straight chain or branched chain, cyclic (having three carbons or more, and including mono- and poly-cyclic, fused and non-fused polycyclic, and bicyclic) or acyclic, optionally substituted in any position with one or more groups $R^S$ as previously described.

The term "$(C_X-C_Y)$hydrocarbylene" means a hydrocarbon diradical of from X to Y carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, optionally substituted in any position with one or more groups $R^S$ as previously described.

The term "substituted" means that at least one hydrogen atom (—H) bonded to a carbon atom or heteroatom of a corresponding unsubstituted compound or functional group is replaced by a substituent.

When used to describe certain carbon atom-containing chemical groups, a parenthetical expression having the form "$(C_X-C_Y)$" means that the unsubstituted form of the chemical group has from X carbon atoms to Y carbon atoms, inclusive of X and Y. For example, a $(C_1-C_{50})$hydrocarbyl is an hydrocarbyl group having from 1 to 50 carbon atoms in its unsubstituted form. In some embodiments and general structures, certain chemical groups may be substituted by one or more substituents such as $R^S$. An $R^S$ substituted chemical group defined using the "$(C_X-C_Y)$" parenthetical may contain more than Y carbon atoms depending on the identity of any groups $R^S$. For example, a "$(C_1-C_{50})$hydrocarbyl substituted with exactly one group $R^S$, where $R^S$ is phenyl (—$C_6H_5$)" may contain from 7 to 56 carbon atoms. Thus, in general when a chemical group defined using the "$(C_X-C_Y)$" parenthetical is substituted by one or more carbon atom-containing substituents $R^S$, the minimum and maximum total number of carbon atoms of the chemical group is determined by adding to both X and Y the combined sum of the number of carbon atoms from all of the carbon atom-containing substituents $R^S$.

The term "heteroatom," refers to an atom other than hydrogen or carbon. Examples of heteroatoms include nitrogen (N), oxygen (O), and sulfur (S).

In the specific context of the curing agents according to formula (I), the term "heterohydrocarbon" refers to a molecule or molecular framework in which one or more carbon atoms, either in a main chain of a hydrocarbon or in a substituent group in a hydrocarbon, are replaced with a heteroatom.

The term "$(C_X-C_Y)$heterohydrocarbyl" means a monovalent heterohydrocarbon radical of from X to Y carbon atoms. The heterohydrocarbon of the $(C_X-C_Y)$heterohydrocarbyl may include one or more heteroatoms. In specific embodiments of this disclosure, the heterohydrocarbon of the $(C_X-$ $C_Y$)heterohydrocarbyl may include one or more nitrogen atoms, such that the $(C_X\text{-}C_Y)$heterohydrocarbyl or the $(C_X\text{-}C_Y)$heterohydrocarbylene may include at least one primary amine ($-NH_2$ or $=NH$, for example), at least one secondary amine ($-N(H)-$, $-NR^SH$ where $R^S$ is a hydrocarbyl, or $=N-$, for example), or a combination of one or more primary amines and one or more secondary amines. The radical of the heterohydrocarbyl may be on a carbon atom or a heteroatom. Each heterohydrocarbyl may be unsubstituted or substituted (for example, by one or more $R^S$), aromatic or non-aromatic, saturated or unsaturated, straight chain or branched chain, cyclic (including mono- and poly-cyclic, fused and non-fused polycyclic), or acyclic.

Likewise, the term "$(C_X\text{-}C_Y)$heterohydrocarbylene" means a divalent heterohydrocarbon radical of from X to Y carbon atoms. The heterohydrocarbon of the $((C_X\text{-}C_Y)$heterohydrocarbylene may include one or more heteroatoms. In specific embodiments, the heterohydrocarbon of the $(C_X\text{-}C_Y)$heterohydrocarbylene may include one or more nitrogen atoms, such that the $(C_X\text{-}C_Y)$heterohydrocarbylene may include at least one primary amine ($-NH_2$ or $=NH$, for example), at least one secondary amine ($-N(H)-$, $-NR^SH$ where $R^S$ is an hydrocarbyl, or $=N-$, for example), or a combination of one or more primary amines and one or more secondary amines. The radicals of the heterohydrocarbylene may be on a carbon atom or on a heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each heterohydrocarbylene may be unsubstituted or substituted (for example, by one or more $R^S$), aromatic or non-aromatic, saturated or unsaturated, straight chain or branched chain, cyclic (including mono- and poly-cyclic, fused and non-fused polycyclic), or acyclic.

In embodiments, $R^3$ and $R^4$ of formula (I) may be non-joined monovalent radicals. When $R^3$ and $R^4$ are non-joined monovalent radicals, $R^3$ and $R^4$ may be identical to each other or different from each other. In some embodiments, $R^3$ and $R^4$ are identical non-joined monovalent radicals. In such embodiments, the 1,10-phenanthroline derivative has formula (Ia), in which $R^1$ and $R^2$ are as defined in formula (I); $R^3$ and $R^4$ are non-joined monovalent radicals as described with respect to formula (I), and at least one of $R^1$, $R^2$, $R^3$, and $R^4$ is not $-H$. It should be readily understood that all compounds according to formula (Ia) also are compounds according to formula (I).

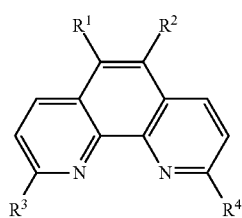

(Ia)

In embodiments of the corrosion-indicating material, examples of non-joined monovalent radicals for groups $R^3$ and $R^4$ of formula (Ia) include $-H$, $-NH_2$, and $(C_1\text{-}C_{20})$ heterohydrocarbyls including at least one primary amine or at least one secondary amine. Specific non-limiting examples of the non-joined monovalent radicals are provided in TABLE 1 as both linear formulas and graphic structures. In the graphic structures, the wavy line across a bond refers to the point of connection of the radical to the main body of the 1,10-phenanthroline molecule.

TABLE 1

Non-limiting examples of non-joined radicals $R^3$ and $R^4$ of formula (Ia)

| Line formula | Graphic formula |
|---|---|
| $-NH_2$ | |
| $-CH_2NH_2$ | |
| $-CH_2N(CH_2CH_2NH_2)_2$ | |
| $-CH_2N(H)(\text{cyclohexyl})$ | |
| $-CH_2N(H)[(CH_2)_d CH_3]$ (d = 1, 2, or 3) | |
| $-CH_2N(H)[(CH_2)_2N(H)(\text{phenyl})]$ | |
| $-CH_2N(H)[(CH_2)(2\text{-pyridyl})]$ | |

In further embodiments, $R^3$ and $R^4$ of formula (I) may be joined as a single divalent radical. The single divalent radical may be a $(C_1\text{-}C_{40})$heterohydrocarbylene that includes at least one primary amine or at least one secondary amine. In such embodiments, the 1,10-phenanthroline derivative has formula (Ib), in which $R^1$ and $R^2$ are as defined in formula (I); and $R^3$ and $R^4$ are joined as a single divalent radical as described with respect to formula (I). It should be readily understood that all compounds according to formula (Ib) also are compounds according to formula (I).

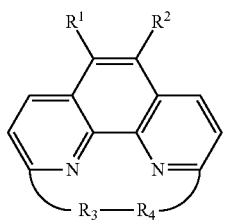

(Ib)

In embodiments of the corrosion-indicating material, specific examples of single divalent radicals of a joined $R^3$ and $R^4$ when the 1,10-phenanthroline derivative has formula (Ib) include —$CH_2$—NH—[($CH_2$)$_x$N(H)—]$_n$$CH_2$—, where x is 2 or 3 and n is 2, 3, 4, or 5; and —CH=N—($CH_2$)$_2$\{—N[($CH_2$)$_2$$NH_2$]—($CH_2$)$_2$\}$_y$—N=CH—, where y is 1 or 2. These specific examples of single divalent radicals result in 1,10-phenanthroline derivatives with macrocyclic moieties, in which the heterohydrocarbylene component of the macrocycle is composed of only carbon, hydrogen, and nitrogen atoms. The macrocyclic 1,10-phenanthroline derivatives, each having formula (Ib), are illustrated in the following TABLE 2.

TABLE 2

Examples of macrocyclic 1,10-phenanthroline derivatives, each having formula (Ib)

| Line formula of $R^3$/$R^4$ divalent radical | Graphic formula of 1,10-phenanthroline derivative |
| --- | --- |
| —$CH_2$—NH—[($CH_2$)$_x$N(H)—]$_n$$CH_2$— (x = 2 or 3; n = 2, 3, 4, or 5) | |
| —CH=N—($CH_2$)$_2$\{—N[($CH_2$)$_2$$NH_2$]—($CH_2$)$_2$\}$_y$—N=CH— (y = 1) | |
| —CH=N—($CH_2$)$_2$\{—N[($CH_2$)$_2$$NH_2$]—($CH_2$)$_2$\}$_y$—N=CH— (y = 2) | |

According to some embodiments, the curing agent may have formula (I) in which $R^1$ and $R^2$ are independently selected from the group consisting of —$NH_2$ and —H and $R^3$ and $R^4$ are defined as previously described with respect to formula (I), formula (Ia), or formula (Ib), provided at least one of $R^1$, $R^2$, $R^3$, and $R^4$ is not —H. Examples of such embodiments include those in which both $R^1$ and $R^2$ are —H; in which both $R^1$ and $R^2$ are —$NH_2$; or in which one of $R^1$ and $R^2$ is —$NH_2$ and the other of $R^1$ and $R^2$ is —H. In further embodiments, $R^1$, $R^2$, $R^3$, and $R^4$ of formula (I) are independently —$NH_2$ or —H, provided at least one of $R^1$, $R^2$, $R^3$, and $R^4$ is —$NH_2$. Examples of such embodiments include a compound of formula (I) in which $R^1$ and $R^2$ are —$NH_2$ and $R^3$ and $R^4$ are —H; or in which $R^1$, $R^3$, and $R^4$ are —H, and $R^2$ is —$NH_2$. In specific examples of the foregoing embodiments, the curing agent is chosen from 1,10-phenanthroline-5-amine or 1,10-phenanthroline-5,6-diamine, and 1,10-phenanthroline-2,9-diamine.

In further embodiments, the curing agent may have formula (I), in which $R^3$ and $R^4$ are as previously defined and $R^1$ and $R^2$ may be selected from —$NH_2$; —$NH(CH_2)_aNH_2$; where a is 1, 2, or 3; or —$OC(=O)(CH_2)_bNH_2$, where b is 1, 2, or 3; and —H. Non-limiting examples of such curing agents may be prepared by from 5,6-Epoxy-5,6-dihydro-[1,10]phenanthroline according to the following reaction scheme, in which both $R^3$ and $R^4$ of the resulting curing agent are —H:

described. In an example embodiment, the corrosion-indicating material may be prepared by preparing separate solutions of a DGEBA epoxy resin and a curing agent according to formula (I), then mixing the solutions. An example of a suitable solvent for both solutions includes tetrahydrofuran (THF). Upon combination of the DGEBA and the curing agent, curing may occur spontaneously, or upon application of heat. When the solvent evaporates, the cured product is left behind. In embodiments, the curing procedure may be performed in sufficient solvent to provide suitable viscosity to the solution to enable application of the mixture as a coating composition to a substrate such as a metal substrate, so as to form a coated article that produces a color change when corrosion of the article occurs.

Having described the corrosion-indicating material, embodiments of methods for applying the corrosion-indicating material will now be described.

In methods for applying a corrosion-indicating material, the corrosion-indicating material may be a corrosion-indicating material according to any of the embodiments previously described in this disclosure. The methods may include curing a DGEBA epoxy resin and a curing agent according to formula (I) in sufficient solvent to form a spreadable coating composition. Alternatively, the methods may include dissolving or softening a dried, cured product of the DGEBA epoxy resin and curing agent of formula (I) in a sufficient amount of a suitable solvent to provide a spread-

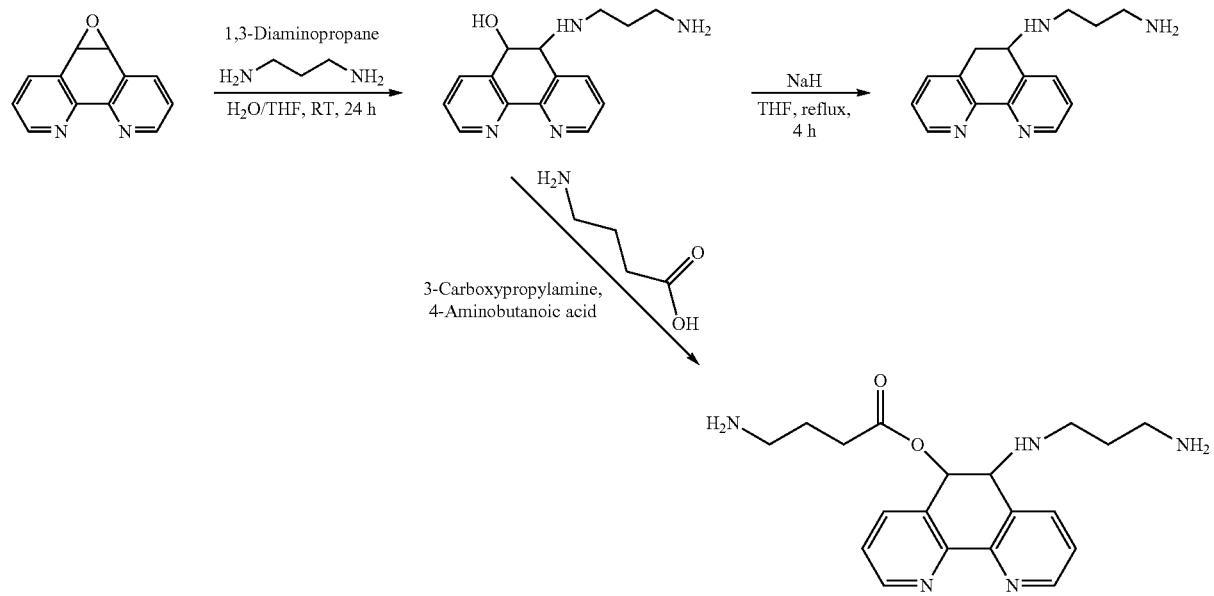

The 1,10-phenanthroline derivatives having formula (I) as previously described may be prepared by any suitable synthetic strategy with 1,10-phenanthroline or 5,6-Epoxy-5,6-dihydro-[1,10]phenanthroline as a starting material. Exemplary synthetic schemes for preparing 1,10-phenanthroline derivatives include those disclosed in A. Bencini and V. Lippolis, 1,10-*Phenanthroline: A Versatile Building Block for the Construction of Ligands for Various Purposes*, Coordination Chemistry Reviews, volume 254 (2010), pages 2096-2180, and references cited therein.

As previously described, the corrosion-indicating materials according to embodiments are cured products of reacting a bisphenol A diglycidyl ether (DGEBA) epoxy resin with a curing according to formula (I), as previously able coating composition. Examples of suitable solvents for applying the coating composition include, without limitation, tetrahydrofuran, chloroform, and isopropanol. The corrosion-indicating material may be combined with the solvent via mixing. The methods may include adding the corrosion-indicating material to the solvent and mixing, or adding the solvent to the corrosion-indicating material and mixing.

The methods for applying the coating composition, specifically in preparing the coating composition for spreading, may then include heating the coating composition at from 50° C. to 130° C., from 50° C. to 110° C., from 50° C. to 100° C., from 50° C. to 90° C., from 50° C. to 80° C., from 50° C. to 70° C., from 70° C. to 130° C., from 70° C. to 110° C., from 70° C. to 100° C., from 70° C. to 90° C., from 70°

C. to 80° C., from 80° C. to 130° C., from 80° C. to 110° C., from 80° C. to 100° C., from 80° C. to 90° C., from 90° C. to 130° C., from 90° C. to 110° C., from 90° C. to 100° C., from 100° C. to 130° C., from 100° C. to 110° C., from 110° C. to 130° C., or at about 90° C. The hearing may be carried out over example heating times such as from 1 hour to 30 hours, from 1 hour to 20 hours, from 1 hour to 17 hours, from 1 hour to 15 hours, from 1 hour to 13 hours, from 1 hour to 10 hours, from 1 hour to 5 hours, from 5 hours to 30 hours, from 5 hours to 20 hours, from 5 hours to 17 hours, from 5 hours to 15 hours, from 5 hours to 13 hours, from 5 hours to 10 hours, from 10 hours to 30 hours, from 10 hours to 20 hours, from 10 hours to 17 hours, from 10 hours to 15 hours, from 10 hours to 13 hours, from 13 hours to 30 hours, from 13 hours to 20 hours, from 13 hours to 17 hours, from 13 hours to 15 hours, from 15 hours to 30 hours, from 15 hours to 20 hours, from 15 hours to 17 hours, from 17 hours to 30 hours, from 17 hours to 20 hours, from 20 hours to 30 hours, or for about 15 hours. In some embodiments, the heating may be performed while stirring the coating composition with a suitable stirring apparatus such as a mixer, at a suitable speed such as from 100 revolutions per minute (rpm) to 500 rpm.

The methods for applying the coating composition may further include coating a metal substrate with the coating composition. The coating composition may be a spreadable liquid having a viscosity of from 1000 cP to 500,000 cP, from 1000 cP to 300,000 cP, from 1000 cP to 100,000 cP, from 1000 cP to 50,000 cP, from 1000 cP to 20,000 cP, from 1000 cP to 10,000 cP, from 1000 cP to 5000 cP, from 5000 cP to 500,000 cP, from 5000 cP to 300,000 cP, from 5000 cP to 100,000 cP, from 5000 cP to 50,000 cP, from 5000 cP to 20,000 cP, from 5000 cP to 10,000 cP, from 10,000 cP to 500,000 cP, from 10,000 cP to 300,000 cP, from 10,000 cP to 100,000 cP, from 10,000 cP to 50,000 cP, from 10,000 cP to 20,000 cP, from 20,000 cP to 500,000 cP, from 20,000 cP to 300,000 cP, from 20,000 cP to 100,000 cP, from 20,000 cP to 50,000 cP, from 50,000 cP to 500,000 cP, from 50,000 cP to 300,000 cP, from 50,000 cP to 100,000 cP, from 100,000 cP to 500,000 cP, from 100,000 cP to 300,000 cP, or from 300,000 cP to 500,000 cP. Coating the metal substrate may include any suitable technique for covering a substrate or portion of a substrate with a liquid solution having the viscosity of the coating composition. Example techniques for covering the substrate may include painting or spraying the coating composition onto the metal substrate.

In some embodiments, upon application of the coating composition to the substrate or metal substrate, the coating composition may be a surface layer overlying the metal substrate. Such a surface layer may cover at least a portion of the surface of the metal substrate. The coating composition may cover the entire surface of the metal substrate or, alternatively, may only partially surround the metal substrate, leaving at least a portion of the surface of the metal substrate uncoated or otherwise exposed. In embodiments, the coating composition may be the outermost coating of the metal substrate with one or more other, intervening, coatings, positioned between the coating composition and the metal substrate. In such embodiments, as opposed to directly contacting the metal substrate, the coating composition indirectly contacts the metal substrate or is in communication with the metal substrate such that metal ions resulting from corrosion of the metal substrate can contact the coating composition.

Further embodiments of the present disclosure include a coating composition for applying the corrosion-indicating material, as previously described, to a substrate such as a metal substrate. The coating composition may include a corrosion-indicating material according to any embodiment as previously described and a solvent. In example embodiments, the solvent may include tetrahydrofuran (THF), chloroform, acetone, isopropanol, or any other organic polar solvent.

Further embodiments of this disclosure include articles onto which the corrosion-indicating material have been applied, such that the corrosion-indicating material is capable of indicating corrosion of the article. Thus, the articles may include a metal substrate and a corrosion-indicating material as previously described. A layer of the corrosion-indicating material may overlie a surface of the metal substrate.

In the articles according to embodiments, the metal substrate may include an oxidizable metal. Oxidizable metals include any metal that, upon corrosion by any means, produces positive metal ions capable of forming complexes with the corrosion-indicating materials described in this disclosure. In example embodiments, the oxidizable metal may be selected from iron, vanadium, chromium, manganese, cobalt, nickel, copper, and combinations of any of the foregoing. As a non-limiting example, when the metal substrate is selected from iron, the metal substrate may include iron alloys and iron-based steels. The oxidizable metal may be converted to metal ions when the metal substrate corrodes. The metal ions may then form complexes with the 1,10-phenanthroline derivative in the corrosion-indicating material, which is a cured product of reacting DGEBA epoxy resin with a 1,10-phenanthroline derivative having formula (I) curing agent as previously described. In turn, the complexes may impart a color change to the corrosion-indicating material in the presence of the moisture from an initial color before corrosion to a corrosion-indicative color different from the initial color. It should be understood that the specific color change imparted to the corrosion-indicting material will vary based on the identity of the oxidizable metal in the metal substrate that has formed positive metal ions when the metal substrate has corroded.

The following scheme illustrates an example of the mechanism for corrosion detection by a corrosion-indicating material according to embodiments of this disclosure, when applied as a coating material onto a metal substrate that includes an iron component:

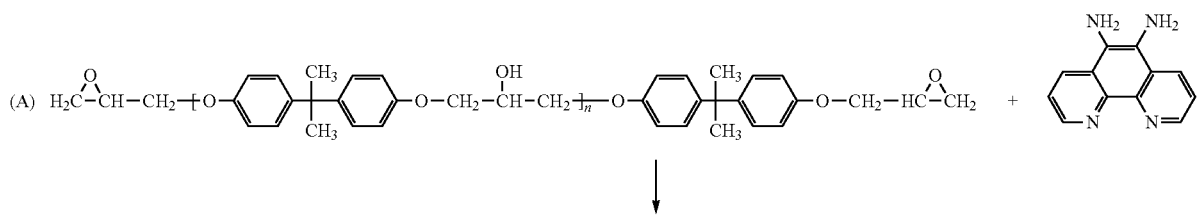

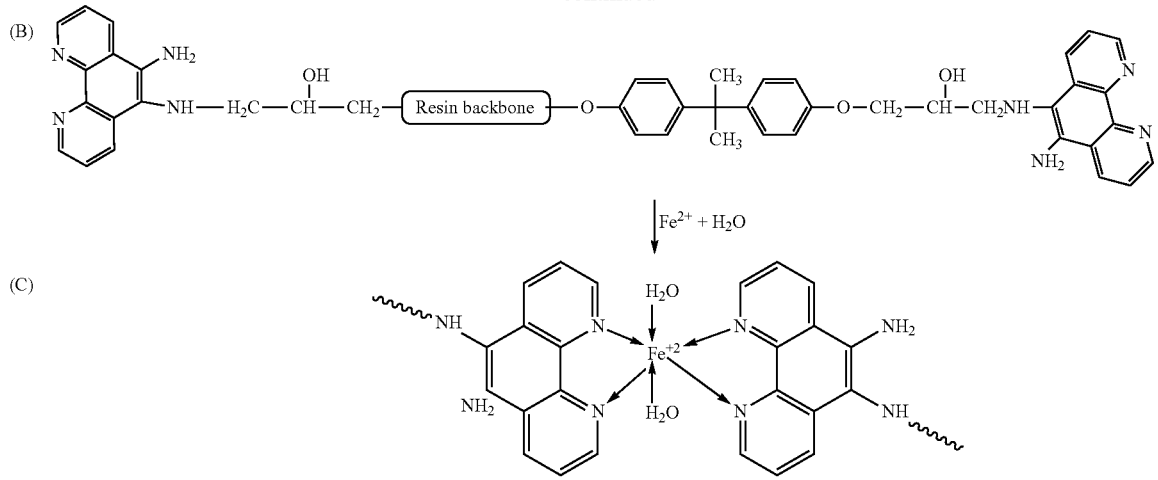

In the foregoing scheme, line (A) represents the reaction of DGEBA epoxy resin with 1,10-phenanthroline-5,6-diamine, an example curing agent according to formula (I) as previously described. Line (B) schematically illustrates two molecules of the curing agent covalently bonded to respective ends of a resin backbone to form a cured product of a reaction of the DGEBA and the curing agent. It should be understood that the reaction scheme is simplified and that in a corrosion-indicating material according to embodiments, a crosslinked structure may result to the resin material. Regardless, line (B) illustrates that the corrosion-indicating material incorporates the curing agent into the main structure. When the corrosion-indicating material is applied to a substrate as a coating material, the molecules of curing agent incorporated into the resin structure remain capable of forming complexes. As illustrated in line (C) of the foregoing scheme, two molecules of curing agent, each covalently bonded to a resin backbone indicated by the long wavy lines, account for four positions in a hexagonal complex with a single iron (Fe) ion, particularly Fe(II). The other two positions of the hexagonal complex are occupied by water molecules. This particular complex results when Fe(II) is produced from the corrosion of the metal substrate in the presence of moisture, namely, water. Though the cured product of line (B) may be clear or may have an initial color such as yellow or light orange, the complex illustrated in line (C) has a distinctive, dark-red color. Thus, it should be understood that the corrosion-indicating material indicates corrosion of the metal substrate underlying the corrosion-indicating material when the color changes from the initial color to the dark-red color.

EXAMPLE

The following example illustrates one or more additional features of the present disclosure described previously. It should be understood that these examples are not intended to limit the scope of the disclosure or the appended claims in any manner.

To produce a coating including DGEBA resin and phenanthroline derivatives, 0.5 grams (g) of 1,10-phenanthroline-5-amine was dissolved in 5 ml tetrahydrofuran. Then, 1.0 g of DGEBA resin was dissolved in 2 milliliters (mL) of tetrahydrofuran. Then, both mixtures were combined and 20 mL of additional tetrahydrofuran was added to form the coating composition. The coating composition was then heated at 90° C. for 15 hours while stirring at 350 RPM using a H3770-S Digital Hotplate Magnetic Stirrer from Benchmark Scientific, headquartered in New Jersey. The coating composition was then cast as a thin layer on a glass substrate and left overnight at 120° C. to react. This ensured that all excess solvent was evaporated and that the epoxy monomer was fully crosslinked. The solvent dried from the coating composition, leaving a smooth coating of corrosion-indicating material on the surface of the glass. The corrosion-indicating material had a light-yellow color.

The coated glass substrate, upon contact with Fe(II) ions and moisture, changes color from light-yellow to dark-red.

It should be apparent to those skilled in the art that various modifications and variations may be made to the embodiments described within without departing from the scope of the claimed subject matter. Thus, it is intended that the specification cover the modifications and variations of the various embodiments described within provided such modification and variations come within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Embodiments of this disclosure may incorporate one or more of the following aspects of the present disclosure, without limitation:

A first aspect of the present disclosure may be directed to a corrosion-indicating material that indicates corrosion of a metal substrate underlying the corrosion-indicating material, the corrosion-indicating material comprising a cured product of reacting a bisphenol A diglycidyl ether (DGEBA) epoxy resin with a curing agent, the curing agent comprising a 1,10-phenanthroline derivative having formula (I):

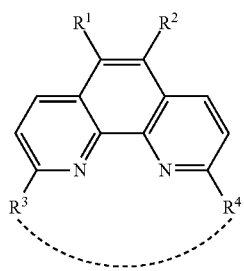

where: $R^1$ and $R^2$ are independently selected from —$NH_2$; —$NH(CH_2)_aNH_2$, where a is 1, 2, or 3; —$OC(=O)(CH_2)_bNH_2$, where b is 1, 2, or 3; and —H; $R^3$ and $R^4$ are either: non-joined monovalent radicals each independently chosen from —H, —$NH_2$, and ($C_1$-$C_{20}$)heterohydrocarbyls comprising at least one primary amine or at least one secondary amine; or joined as a single divalent radical, the single divalent radical being a ($C_1$-$C_{40}$)heterohydrocarbylene comprising at least one primary amine or at least one secondary amine; and at least one of $R^1$, $R^2$, $R^3$, and $R^4$ is not —H.

A second aspect of the present disclosure may be directed to an article comprising a metal substrate and a layer of the corrosion-indicating material of the first aspect overlying a surface of the metal substrate.

A third aspect of the present disclosure may be directed to a coating composition comprising a corrosion-indicating resin according to the first aspect and a solvent.

Another aspect of the present disclosure may include any of the previous aspects, in which: the non-joined monovalent radicals are selected from the group consisting of —$NH_2$, —$CH_2NH_2$, —$CH_2N(CH_2CH_2NH_2)_2$, —$CH_2N(H)$(cyclohexyl), —$CH_2N(H)[(CH_2)_dCH_3]$, where d is 1, 2, or 3, —$CH_2N(H)[(CH_2)_2N(H)(phenyl)]$, —$CH_2N(H)[(CH_2)(2$-pyridyl$)]$, and —H; or the single divalent radical is selected from the group consisting of —$CH_2$—NH—$[(CH_2)_xN(H)—]_nCH_2$—, where x is 2 or 3 and n is 2, 3, 4, or 5; and —$CH=N$—$(CH_2)_2\{-N[(CH_2)_2NH_2]-(CH_2)_2\}_y$—$N=CH$—, where y is 1 or 2.

Another aspect of the present disclosure may include any of the previous aspects, in which $R^1$ and $R^2$ are independently selected from the group consisting of —$NH_2$ and —H.

Another aspect of the present disclosure may include any of the previous aspects, in which both $R^1$ and $R^2$ are —H.

Another aspect of the present disclosure may include any of the previous aspects, in which both $R^1$ and $R^2$ are —$NH_2$.

Another aspect of the present disclosure may include any of the previous aspects, in which one of $R^1$ and $R^2$ is —$NH_2$ and the other of $R^1$ and $R^2$ is —H.

Another aspect of the present disclosure may include any of the previous aspects, in which $R^1$, $R^2$, $R^3$, and $R^4$ are independently —$NH_2$ or —H, provided at least one of $R^1$, $R^2$, $R^3$, and $R^4$ is —$NH_2$.

Another aspect of the present disclosure may include any of the previous aspects, in which: $R^1$ and $R^2$ are —H; and $R^3$ and $R^4$ are —$NH_2$.

Another aspect of the present disclosure may include any of the previous aspects, in which: $R^1$ and $R^2$ are —$NH_2$; and $R^3$ and $R^4$ are —H.

Another aspect of the present disclosure may include any of the previous aspects, in which: $R^1$, $R^3$, and $R^4$ are —H; and $R^2$ is —$NH_2$.

Another aspect of the present disclosure may include any of the previous aspects, in which $R^3$ and $R^4$ are identical non-joined monovalent radicals.

Another aspect of the present disclosure may include any of the previous aspects, in which both $R^3$ and $R^4$ are —$NH_2$.

Another aspect of the present disclosure may include any of the previous aspects, in which $R^3$ and $R^4$ are identical non-joined monovalent radicals selected from the group consisting of —$CH_2NH_2$, —$CH_2N(CH_2CH_2NH_2)_2$, —$CH_2N(H)$(cyclohexyl), —$CH_2N(H)[(CH_2)_dCH_3]$ where d is 1, 2, or 3, —$CH_2N(H)[(CH_2)_2N(H)(phenyl)]$, and —$CH_2N(H)[(CH_2)(2$-pyridyl$)]$.

Another aspect of the present disclosure may include any of the previous aspects, in which $R^3$ and $R^4$ are joined as a single divalent radical having the formula —$CH_2$—NH—$[(CH_2)_xN(H)—]_nCH_2$—, where x is 2 or 3 and n is 2, 3, 4, or 5.

Another aspect of the present disclosure may include any of the previous aspects, in which $R^3$ and $R^4$ are joined as a single divalent radical having the formula —$CH=N$—$(CH_2)_2\{-N[(CH_2)_2NH_2]-(CH_2)_2\}_y$—$N=CH$—, where y is 1 or 2.

Another aspect of the present disclosure may include any of the previous aspects, in which: the metal substrate comprises an oxidizable metal that is converted to metal ions when the metal substrate corrodes; the metal ions form complexes with the 1,10-phenanthroline derivative present in the corrosion-indicating material; the complexes impart a color change to the corrosion-indicating material in the presence of moisture from an initial color before corrosion to a corrosion-indicative color different from the initial color.

Another aspect of the present disclosure may include any of the previous aspects, in which the oxidizable metal is selected from iron, vanadium, chromium, manganese, cobalt, nickel, copper, and combinations of any of the foregoing.

Another aspect of the present disclosure may include any of the previous aspects, in which the metal substrate is selected from iron, iron alloys, and iron-based steels.

Another aspect of the present disclosure may include any of the previous aspects, in which the solvent comprises tetrahydrofuran (THF), chloroform, acetone, isopropanol, or combinations thereof.

Having described the subject matter of the present disclosure in detail and by reference to specific embodiments, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A corrosion-indicating material that indicates corrosion of a metal substrate underlying the corrosion-indicating material, the corrosion-indicating material comprising a cured product of reacting a bisphenol A diglycidyl ether (DGEBA) epoxy resin with a curing agent, the curing agent comprising a 1,10-phenanthroline derivative having formula (I):

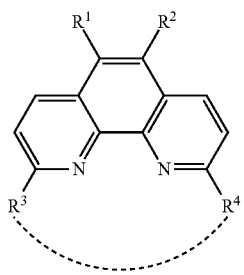

where:
$R^1$ and $R^2$ are independently selected from —$NH_2$; —$NH(CH_2)_aNH_2$, where a is 1, 2, or 3; —OC(═O)$(CH_2)_bNH_2$, where b is 1, 2, or 3; and —H;
$R^3$ and $R^4$ are either:
non-joined monovalent radicals each independently chosen from —H, —$NH_2$, and ($C_1$-$C_{20}$)heterohydrocarbyls comprising at least one primary amine or at least one secondary amine; or
joined as a single divalent radical, the single divalent radical being a ($C_1$-$C_{40}$)heterohydrocarbylene comprising at least one primary amine or at least one secondary amine;
at least one of $R^1$, $R^2$, $R^3$, and $R^4$ is not —H; and
provided at least one of (i), (ii), (iii), (iv), (v), or (vi) is true:
(i) $R^1$ and $R^2$ are independently selected from the group consisting of —$NH_2$ and —H and:
both $R^1$ and $R^2$ are —H, or
both $R^1$ and $R^2$ are —$NH_2$; or (ii) $R^1$, $R^2$, $R^3$, and $R^4$ are independently —$NH_2$ or —H, provided at least one of $R^1$, $R^2$, $R^3$, and $R^4$ is —$NH_2$ and:
$R^1$ and $R^2$ are —H and $R^3$ and $R^4$ are —$NH_2$, or
$R^1$ and $R^2$ are —$NH_2$ and $R^3$ and $R^4$ are —H; or
(iii) both $R^3$ and $R^4$ are —$NH_2$; or
(iv) $R^3$ and $R^4$ are identical non-joined monovalent radicals selected from the group consisting of —$CH_2NH_2$, —$CH_2N(CH_2CH_2NH_2)_2$, —$CH_2N(H)$(cyclohexyl), —$CH_2N(H)[(CH_2)_dCH_3]$ where d is 1, 2, or 3, —$CH_2N(H)[CH_2)_2N(H)$(phenyl)], and —$CH_2N(H)[CH_2)$(2-pyridyl)]; or
(v) $R^3$ and $R^4$ are joined as a single divalent radical having the formula —$CH_2$—NH—$[(CH_2)_xN(H)$—$]_nCH_2$—, where x is 2 or 3 and n is 2, 3, 4, or 5; or
(vi) $R^3$ and $R^4$ are joined as a single divalent radical having the formula —CH═N—$(CH_2)_2${—N$[CH_2)_2NH_2]$—$(CH_2)_2\}_y$—N═CH—, where y is 1 or 2.

2. The corrosion-indicating material of claim 1, in which at least (i) is true and:
the non-joined monovalent radicals are selected from the group consisting of —$NH_2$, —$CH_2NH_2$, —$CH_2N(CH_2CH_2NH_2)_2$, —$CH_2N(H)$(cyclohexyl), —$CH_2N(H)[(CH_2)_dCH_3]$, where d is 1, 2, or 3, —$CH_2N(H)[(CH_2)_2N(H)$(phenyl)], —$CH_2N(H)[CH_2)$(2-pyridyl)], and —H; or
the single divalent radical is selected from the group consisting of —$CH_2$—NH—$[(CH_2)_xN(H)$—$]_nCH_2$—, where x is 2 or 3 and n is 2, 3, 4, or 5; and —CH═N—$(CH_2)_2${—N$[(CH_2)_2NH_2]$—$(CH_2)_2\}_y$—N═CH—, where y is 1 or 2.

3. The corrosion-indicating material of claim 1, in which at least one of (iii) through (vi) is true and one of $R^1$ and $R^2$ is —$NH_2$ and the other of $R^1$ and $R^2$ is —H.

4. The corrosion-indicating material of claim 1, in which at least (i) is true and $R^3$ and $R^4$ are identical non-joined monovalent radicals.

5. An article comprising a metal substrate and a layer of the corrosion-indicating material according to claim 1 overlying a surface of the metal substrate.

6. The article of claim 5, in which:
the metal substrate comprises an oxidizable metal that is converted to metal ions when the metal substrate corrodes;
the metal ions form complexes with the 1,10-phenanthroline derivative present in the corrosion-indicating material;
the complexes impart a color change to the corrosion-indicating material in the presence of moisture from an initial color before corrosion to a corrosion-indicative color different from the initial color.

7. The article of claim 6, in which the oxidizable metal is selected from iron, vanadium, chromium, manganese, cobalt, nickel, copper, and combinations of any of the foregoing.

8. The article of claim 5, in which the metal substrate is selected from iron, iron alloys, and iron-based steels.

9. A coating composition comprising a corrosion-indicating resin according to claim 1 and a solvent.

10. The coating composition of claim 9, in which the solvent comprises tetrahydrofuran (THF), chloroform, acetone, isopropanol, or combinations thereof.

* * * * *